US010726122B2

(12) United States Patent
Regner et al.

(10) Patent No.: US 10,726,122 B2
(45) Date of Patent: Jul. 28, 2020

(54) AUTOMATIC RESET FILTER DEACTIVATION DURING CRITICAL SECURITY PROCESSES

(71) Applicant: NXP B.V., Eindhoven (DE)

(72) Inventors: Markus Regner, Munich (DE); Jürgen W. Frank, Munich (DE); Stefan Doll, Munich (DE)

(73) Assignee: NXP B.V., Eindhoven (NL)

( * ) Notice: Subject to any disclaimer, the term of this patent is extended or adjusted under 35 U.S.C. 154(b) by 142 days.

(21) Appl. No.: 15/640,804

(22) Filed: Jul. 3, 2017

(65) Prior Publication Data
US 2019/0005269 A1 Jan. 3, 2019

(51) Int. Cl.
| | | |
|---|---|---|
| G06F 21/54 | (2013.01) | |
| G06F 21/71 | (2013.01) | |
| G06F 21/55 | (2013.01) | |
| G06F 21/57 | (2013.01) | |
| H03K 19/17768 | (2020.01) | |
| G06F 21/60 | (2013.01) | |
| G06F 21/75 | (2013.01) | |

(52) U.S. Cl.
CPC .............. *G06F 21/54* (2013.01); *G06F 21/55* (2013.01); *G06F 21/554* (2013.01); *G06F 21/577* (2013.01); *G06F 21/602* (2013.01); *G06F 21/71* (2013.01); *G06F 21/755* (2017.08); *H03K 19/17768* (2013.01)

(58) Field of Classification Search
CPC ................................ G06F 21/54; G06F 21/554
See application file for complete search history.

(56) References Cited

U.S. PATENT DOCUMENTS

| | | | | |
|---|---|---|---|---|
| 7,348,836 B1 * | 3/2008 | Velmurugan | ............. | G06F 1/28 327/545 |
| 7,541,880 B2 | 6/2009 | Galloway et al. | | |
| 7,986,252 B1 | 7/2011 | Iqbal et al. | | |
| 8,896,086 B1 * | 11/2014 | Arora | ...................... | G06F 21/86 257/428 |
| 10,063,159 B1 * | 8/2018 | Kong | ...................... | H02M 1/08 |
| 10,523,418 B2 * | 12/2019 | Hamburg | ................ | G06F 21/44 |
| 2003/0226082 A1 * | 12/2003 | Kim | ..................... | G06K 19/073 714/734 |

(Continued)

OTHER PUBLICATIONS

Beringuier-Boher, Noemie; Hely, David; Beroulle, Vincent; Gomina, Kamil; Rigaud, Jean-Baptiste; Tria, Assia; Damiens, Joel; Gendrier, Philippe; Candelier, Philippe; "Voltage Glitch Attacks on Mixed-Signal Systems", 17th Euromicro Conference on Digital System Design, IEEE, Aug. 27-29, 2014, pp. 379-386.*

(Continued)

*Primary Examiner* — Victor Lesniewski

(57) ABSTRACT

A method, system, and apparatus are provided for preventing glitch attacks by using a glitch processing hardware unit (1) to deactivate a glitch filter connected between the monitored line and a reset processing unit in response to detecting a voltage glitch on a monitored line during a specified security system sequence and (2) to automatically drive a requested reaction in response to the voltage glitch by driving one of a plurality of configurable reactions comprising a device reset reaction and a process restart request, thereby preventing the voltage glitch from maliciously influencing the specified security system sequence.

20 Claims, 5 Drawing Sheets

(56) References Cited

U.S. PATENT DOCUMENTS

| | | | |
|---|---|---|---|
| 2006/0186927 A1* | 8/2006 | Cusmano | H03K 5/1252 |
| | | | 327/34 |
| 2008/0061843 A1* | 3/2008 | Yanci | H03K 5/1252 |
| | | | 327/78 |
| 2008/0086781 A1 | 4/2008 | Rodgers | |
| 2010/0299756 A1 | 11/2010 | Ostertun et al. | |
| 2013/0314998 A1* | 11/2013 | Minz | H03K 5/1252 |
| | | | 365/185.18 |
| 2014/0025960 A1* | 1/2014 | McLean | G06F 21/575 |
| | | | 713/189 |
| 2014/0055165 A1* | 2/2014 | Gopal | H03K 5/1252 |
| | | | 327/34 |
| 2015/0048880 A1* | 2/2015 | Liu | H03K 5/1252 |
| | | | 327/552 |
| 2015/0346246 A1* | 12/2015 | Tasher | G01R 19/16552 |
| | | | 324/762.01 |
| 2017/0286680 A1* | 10/2017 | Benoit | G06F 21/566 |

OTHER PUBLICATIONS

Freescale Semiconductor, Hybrid MCU Architecture Introduction, Embedded Connectivity Summit 2004.

Noemie Beringuier-Boher et al., Abstract from "Voltage Glitch Attacks on Mixed-Signal Systems," 2014 17th Euromicro Conference on Digital System Design (DSD), Aug. 27-29, 2014, Verona.

Asier Goikoetxea Yanci et al., Abstract from "Characterization of a Voltage Glitch Attack Detector for Secure Devices," Symposium on Bio-inspired Learning and Intelligent Systems for Security, 2009, Bliss '09, Aug. 20-21, 2009, Edinburgh.

\* cited by examiner t{1} < t{filter} and t{2} < t{filter}
BOTH GLITCHES FILTERED,
NO RESET REQUEST

AUTOMATIC RESET FILTER DEACTIVATION DURING CRITICAL SECURITY PROCESSES

BACKGROUND OF THE INVENTION

Field of the Invention

The present invention is directed in general to field of security protection in data processing systems. In one aspect, the present invention relates generally to a method and apparatus for protecting against fault attacks (most prominently glitch attacks) on data processing system.

Description of the Related Art

Data processing systems, such as automotive controller chips, set-top box systems, chip cards, and other System-On-Chip (SOC) circuits, whose signals or data convey confidential or secret information, are increasingly subjected to attacks to reach or process stored data. While various techniques are used to secure the protected data with protecting circuits and/or data encrypting algorithms, the value of the protected data results in such systems being the target of security or hacking attacks, such as game console attacks (which use a FPGA to glitch one line of the memory bus), cipher attacks (which flip a single bit in RSA decryption process to get additional information about the private key), key transfer attacks (which set parts of a key to zero during the transfer to derive the key's complete value), Cisco activity attacks using the "Autonomous bootstrap configuration of the secure boot process" feature to recalculate the BOOT_MAC), and power glitch attacks (which use the ChipWhisperer® system to change the core behavior). One prominent hacking technique is a so-called glitch attack whereby a voltage spike is applied a glitch filter that is provided on the system to avoid the natural and short-time noise, fluctuations, oscillations (e.g., on supply lines), and the like that will cause the SoC to react and drive a reset. By introducing a voltage spike to an internal bus, I/O port, or power supply or reset line of a data processing system which is filtered by device-internal glitch-filters to drive the device out of specification range (for a small time), the system may be placed in an unstable and/or unpredictable state that allows the attacker to either obtain secret device-internal information or to maliciously influence the device to cause damage. For example, a hacker may inject a voltage glitch on a voltage supply or reset line to temporarily shift the threshold voltages of transistors or logic gates, causing the hardware to skip certain procedures so that the hacker can take control of portions of the logic, hijack data before it is encrypted, obtain information regarding device architecture or the protected data itself, etc.

In order to avoid or prevent such undesired attacks on the confidential data, security protection countermeasures are used to block hacking techniques. Unfortunately today's implemented glitch filters are not capable of differentiating between a "harmless" glitch, such as those caused by noise on a supply line, and an "offensive" glitch caused by a hacker. As seen from the foregoing, the existing solutions for detecting and preventing glitch attacks are extremely difficult at a practical level by virtue of the difficulty balancing the design constraints for providing security protection to data processing systems with performance and availability demands and the need to filter natural and short-time noise, fluctuation, oscillation (e.g., on supply lines), and the like.

BRIEF DESCRIPTION OF THE DRAWINGS

The present invention may be understood, and its numerous objects, features and advantages obtained, when the following detailed description of a preferred embodiment is considered in conjunction with the following drawings.

DETAILED DESCRIPTION

Figure 1:
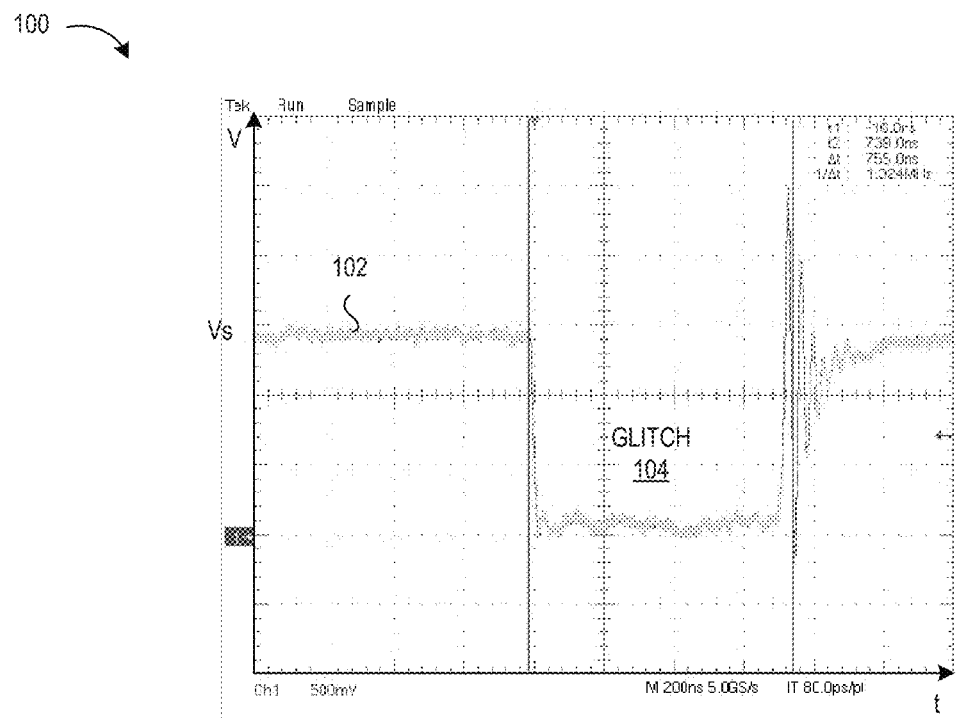
FIG. 1 is a timing diagram illustration of a voltage glitch on a supply voltage reset line resulting from a glitch attack.

A system, apparatus, and methodology are described for employing glitch security detection hardware in a device to deactivate reset glitch filters upon detecting glitches (that would be derived from an attack preferentially applied during critical or security processes) during defined critical or security processes, such as security-sensitive device processes, and to then drive different configurable reset reactions to immediately reset the device into a known state, thereby avoiding unintended and unpredictable system conditions. In selected embodiments, the disclosed glitch security detection hardware provides a configurable reset reaction to protect against glitch attacks during security-sensitive device processes or situations, such as lifecycle detection and elaboration, password read out by a system status and configuration module, detection and elaboration of crypto keys, passwords, unique IDs, boot location, and the like. In a first reset reaction mode, the glitch security detection hardware immediately restarts the security-sensitive device process or situation as attempt to continue with the system operation as "unharmed." In a second reset reaction mode, the glitch security detection hardware immediately resets the device into a known state avoiding unintended and unpredictable system conditions. By automatically deactivating a reset filter as part of the reset reaction and/or during the run-time of the known security situation or processes, glitch attacks on reset lines and/or supply voltages—that would not otherwise cause a reset reaction because of the reset filters—can be detected and lead to a predictable and know system behavior instead of an unintended and unpredictable one. In addition, the ability and option to configure the individual reaction requests in either software or firmware or hard-coded in a device allows the individual reaction requests to be tailored to the particular security-sensitive device process or situation, depending on the intended application. In selected embodiments of the disclosed system, apparatus, and methodology, a tradeoff is made between the need for using retaining glitch filters during normal runtime to filter out the naturally noisy fluctuations in the signal or voltage levels, and the need to purposefully allow the noisy fluctuations to drive an immediate reset reaction during the security sensitive processes, even though the technical price for the tradeoff is that natural events may lead to reset situations during security-sensitive situations which are not caused by the hacker. To balance these tradeoffs, security concerns are rated higher than availability during the security sensitive processes, though the device user can choose whether to keep the filters active or not during security-sensitive situations. In disclosing the claimed apparatus, system, and method for employing glitch security detection hardware that uses individually configurable rules, rather than humans, to define the individual reaction requests as process restart or device reset requests, there is disclosed an improvement in computer-related technology for improving the performance, availability, and security of a data processing system.

Figure 2:
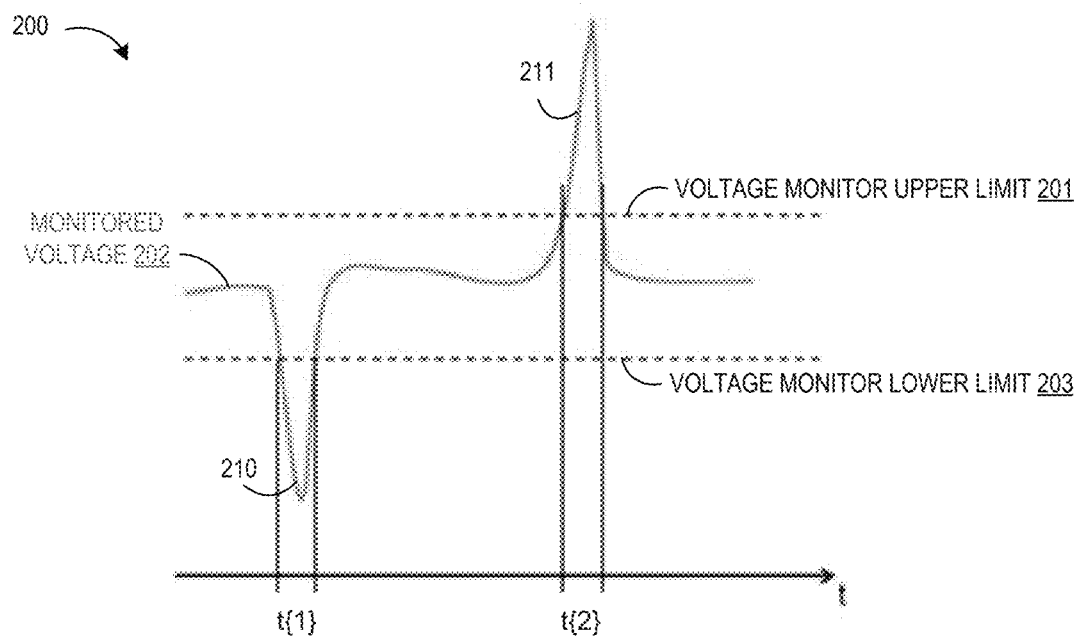
FIG. 2 is a timing diagram illustration of voltage glitches which are filtered without causing a reset request or reaction.

To provide a contextual understanding for selected embodiments of the present disclosure, reference is now made to FIG. 1 which shows a timing diagram illustration 100 of a supply voltage waveform 102 in which a voltage glitch 104 has been induced resulting from a glitch attack. As illustrated, the supply voltage waveform 102 is measured at the reference supply voltage Vs during normal operation. While a variety of glitch attacks could be used to create the voltage glitch 104, a ChipWhisperer® security research tool could be used to perform a side-channel glitch attack, resulting in a glitch duration (e.g., 755 ns). Such glitches are typically filtered by internal glitch reset filters which are intentionally included as part of the SoC in order to prevent unintended reset occurrences in a noisy environment. In operation, a glitch reset filter has a threshold duration t{filter} as the minimum time required (e.g., 3.5 µs) that the filter input must be asserted before the filter output is asserted. As a result, short-duration voltage glitches on a reset line or supply voltage are filtered or removed by the internal glitch reset filters so that no reset response or reaction is generated, allowing the short-duration voltage glitches to maliciously influence the device in the absence of a reset response. To illustrate this result, reference is now made to FIG. 2 which depicts a timing diagram 200 of a monitored voltage waveform 202 in which voltage glitches 210, 211 are induced and filtered without triggering a reset request or reaction. As illustrated, the first voltage glitch 210 undershoots the voltage monitor lower limit 203, but because the duration of the first voltage glitch 210 t{1} is less than the filter threshold duration t{filter}, the glitch is filtered and does not result in a reset request being generated. Similarly, the second voltage glitch 211 overshoots the voltage monitor upper limit 201 without generating a reset request since its duration t{2} is less than the filter threshold duration t{filter}. As a result of the minimum filter threshold duration t{filter} requirement for the glitch reset filters, the glitches 210, 211 are both filtered so that they are not detected as under-voltage or over-voltage situations. Under-voltage or over-voltage situations would have triggered a reset reaction (because of severe nature of an under-voltage or over-voltage circumstance for a microcontroller) in case the glitches would have been applied longer than t{filter}. As seen from the foregoing, the glitch reset filter effectively masks voltage glitch attacks by filtering the glitch voltages so that a reset request is not issued. While one solution to detecting these glitch voltages would be to remove the glitch reset filters entirely, this would dramatically reduce the device's performance and availability in, for example, noisy environments where multiple "natural" and "non-attacking" sources may introduce noise in input or output signals of electrical circuits. Accordingly, there is a need to retain the filtering benefits of glitch reset filters during the bulk of the run-time while being intentionally more 'sensitive' (in a way of switching off filters) to all types of glitches during known security situations in case the device's owner wants to increase the protection of the process underlying the security situation.

Figure 3:
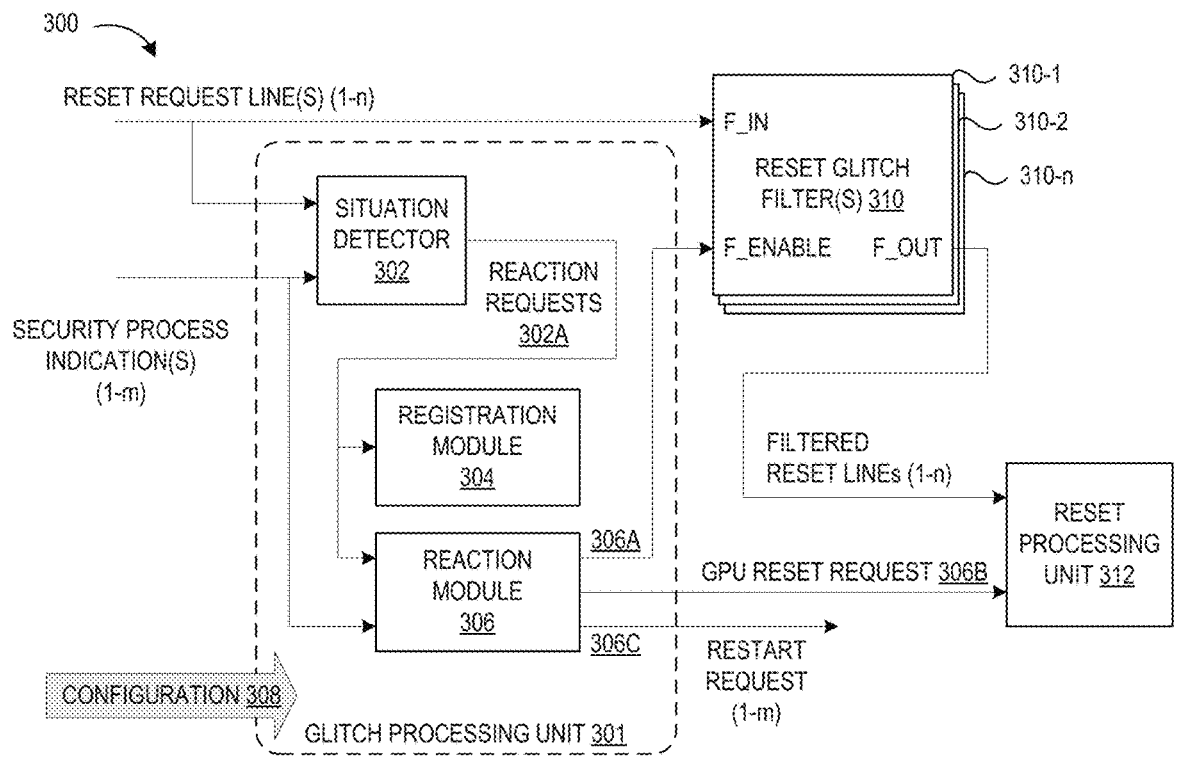
FIG. 3 is a simplified block diagram of a glitch processing system or unit in accordance with selected embodiments of the present disclosure.

To address these competing needs, there is disclosed herein a method and apparatus for automatically deactivating a glitch reset filter only during known critical security processes to provide specified reaction requests, but otherwise retaining the operational benefits of glitch filtering to prevent needless device resets. To provide additional details for an improved understanding of selected embodiments of the present disclosure, reference is now made to FIG. 3 which depicts a simplified block diagram of a glitch processing system 300 which may be embodied as part of a system-on-chip (SoC) device. In an example embodiment, the glitch processing system 300 may be included in a microcontroller SoC device at the input/output control circuitry which includes one or more reset glitch filters 310-1, 310-2, 310-n, each having a filter input (F_IN) connected to monitor a corresponding reset request line (1-n) on which reset requests are generated in response to detected voltage glitches on the SoC device. Each reset glitch filter 310 also includes a filter output (F_OUT) for generating filtered reset request lines (1-n) that are provided to the reset processing unit 312 for handling reset requests to reset the whole SoC device or arts of the SoC device into a known state. As will be appreciated, the processing functionality of the reset glitch filters 310 and reset processing unit 312 are used to protect the SoC device against noisy environments by filtering or removing glitches introduced from noise on the input signals received at or in the SoC device.

In order to selectively deactivate the processing functionality of the reset glitch filters 310 and reset processing unit 312 with respect to the reset glitch filters 310, the glitch processing system 300 includes additional dedicated circuitry in the form of a glitch processing unit (GPU) 301. In operation, the glitch processing unit 301 tracks critical security processes, such as defined security-sensitive device processes or situations, so that the internal glitch filters 310 can be deactivated so that any detected voltage glitches that are logically consistent with the defined security-sensitive device processes or situations can be used to trigger an immediate reset reaction, either by restarting the security-sensitive device process/situation or by forwarding a non-filtered reset request directly to the reset processing unit 312. With either reset reaction, the SoC device is immediately placed in a known and safe state so that the potentially negative effect of the glitch is avoided.

In selected embodiments, the glitch processing unit 301 may be embodied as a hardware circuit component for implementing a situation detector component 302, a registration component module 304, and a reaction component module 306 which are connected to automatically deactivate or disable the reset glitch filters 310 for the duration of specified critical or security processes and to automatically generate reset requests or restart requests which may be processed with or without filtering. As will be appreciated, the specified critical or security processes may be any phase or sequence in operation of the SoC device where vital system settings are established or security relevant mechanisms are being configured and/or activated. Examples include, but are not limited to, lifecycle detection and elaboration, password read out by a system status and configuration modules, detection and elaboration of crypto keys, passwords, boot location, and the like. In this way, the glitch processing unit 301 responds to "attack glitches" that occur during specified critical or security processes to drive a defined reaction which will either result in a renewed process of the sequence as attempt to continue with the system course "unharmed" or immediately reset the SoC device into a known state, thereby avoiding unintended and unpredictable system conditions.

As disclosed herein, the glitch processing unit 301 may be embodied in whole or in part as physical circuitry and/or as a hardware component in the form of software or code representations of physical circuitry or logical representations convertible into physical circuitry, such as in a hardware description language of any appropriate type. In such hardware component embodiments, the user may provide configuration settings 308 to the glitch processing unit 301, such as by using application software and/or a permanent/hard coded configuration data (e.g., values stored in the flash). Stored in configuration data registers, each inherent component 302, 304, 306 of the glitch processing unit 301 has access to configuration data 308.

In the glitch processing unit 301, the situation detector component 302 is connected to monitor n reset request lines (e.g., 1-n) inside the SoC device for purposes of detecting glitches on these lines. In addition, the situation detector component 302 is connected to receive and detect m security process indications (e.g., 1-m), each indication corresponding to a predefined security-relevant processes or situation in the SoC device. When the connected inputs indicate that a voltage glitch is detected on a reset line (as indicated on a reset request line) during the time a security-relevant process or situation is occurring (as indicated on a security process indication), the situation detector component 302 generates a corresponding reaction request 302A to notify the reaction module 306. With n reset lines and m security-relevant situations, the situation detector component 302 may be configured to generate n×m reaction requests.

The glitch processing unit 301 may also include a registration module component 304 that is connected to monitor and register the reaction requests 302A generated by the situation detector component 302. Upon receiving a reaction request 302A, the registration component 304 captures and registers this circumstance so that the user application can access the registered reaction requests immediately or a later point in execution time and take them into account with evaluating or controlling the SoC device. In selected embodiments, the registration component 304 is connected to detect and distinguish between successive or parallel reaction requests 302A. For example, successive and/or parallel reaction requests can be detected and registered separately within distinct registration control registers or storage devices.

In the glitch processing unit 301, the reaction module component 306 is connected to receive and detect the security process indications (e.g., 1-m), along with the reaction requests 302A generated by the situation detector component 302. For each indicated security-relevant process or situation, the reaction module component 306 generates a set of one or more outputs 306A-C to keep the reset glitch filters 310 active, or to deactivate the reset glitch filters 310 during the underlying security-relevant process or situation so that a reset reaction may be executed, depending on the user-specified configuration data 308 provided to the glitch processing unit 301. For example, in the case when reset line glitch is detected during a detected security-relevant process or situation, the reaction module component 306 may set a first output 306A signal that is provided to the filter enable input (F_ENABLE) of the reset glitch filters 310 for purposes of keeping the reset glitch filters 310 active, or may reset the first output 306A signal for purposes of deactivating the reset glitch filters 310 during the underlying security-relevant process or situation. With the filter enable input "reset" (where the filtering is switched off and the glitch is passed through the filter un-changed) at the first output 306A, the reaction module component 306 may be configured by the user to optionally allow a voltage glitch detected on a reset request line to directly pass through the reset glitch filters 310 for handling as a reset request by the reset processing unit 312. However, with the filter enable input "set" (where the filter is active and glitch is blocked in the Reset glitch filter 310 but still identified in glitch processing unit 301) at the first output 306A, the reaction module component 306 may be configured by the user so that any voltage glitch detected on a reset request line is filtered in the reset glitch filters 310 but can still further be processed by the reaction module component 306 in the glitch processing unit 301 by initiating a Restart request 306C or a GPU reset request 306B. Depending on the configuration data 308, the reaction module component 306 may be configured to respond to the reaction request 302A to either effectuate a reset in the SoC device through GPU reset request 306B or to trigger a process restart request 306C.

In a first configured response, the reaction component module 306 responds to the configuration data 308 to generate a glitch processing unit (GPU) reset request 306B to the reset processing unit 312 to reset the entire SoC device or parts thereof into a known state. With the GPU reset request 306B, a user of the SoC device can use the reset processing unit 312 to trigger a different reset request than went through the reset glitch filter 310. As will be appreciated, it can be beneficial for traceability reasons to have a separate reset type that is different from the reset request lines. With this approach, the reaction component module 306 can prevent a glitch having an undefined duration from passing through the reset glitch filters 310 and being handled by the reset processing unit 312, and can instead issue a dedicated GPU reset request 306B with determined duration to trigger the reset processing unit 312.

In a second configured response, the reaction component module 306 responds to the configuration data 308 to generate a process restart request 306C to the module(s) responsible for driving the one security-relevant process or situation that was responsible for triggering the process restart request. With the restart request 306C, the reaction component module 306 can reset the modules into a state in which they immediately restart the same security-relevant process or situation. For example, if a voltage glitch is detected (e.g., on reset line 5) during a specified security-relevant process (e.g., process 3), the reaction component module 306 may be configured to drive a process restart request by issuing a process restart request 306C for the specified security-relevant process (e.g., process 3). This will effectively reset the modules responsible for driving the specified security-relevant process (e.g., process 3) into a state in which this security-relevant process is immediately restarted. With this approach, the reaction component module 306 can use the configuration data 308 to issue a dedicated process restart request 306C to the responsible modules to trigger a process restart sequence.

In selected embodiments, the reaction component module 306 is connected to detect and distinguish between multiple sequential or parallel reaction requests 302A. For example, the reaction component module 306 may be configured to count the number of successive reaction requests 302A for evaluation against a configurable threshold value T that is set for each reaction request. As a result, the reaction component module 306 may be configured to trigger a process restart request 306C for the first T reaction requests (of the same type), but once the number of reaction requests exceeds the threshold value T, the reaction component module 306 then triggers a GPU reset request 306B.

Figure 4:
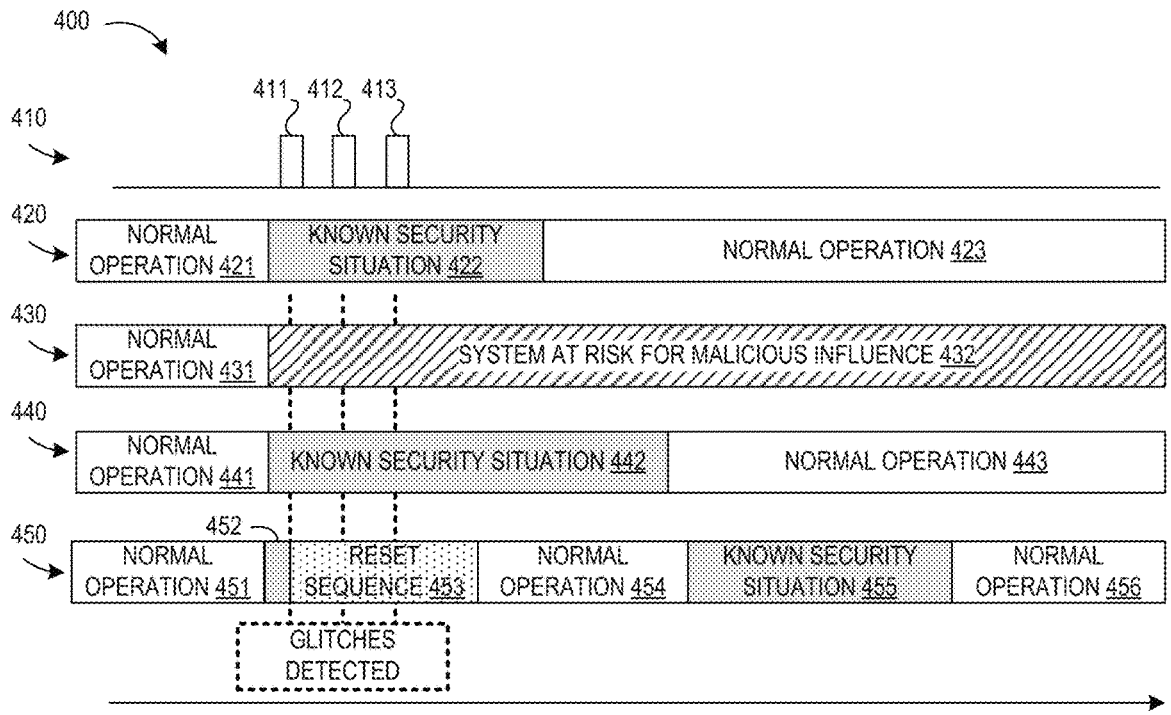
FIG. 4 illustrates a time flow showing the temporal relationship of the effect of glitch occurrences on the intended system process in accordance with selected embodiments of the present disclosure.

For an improved understanding of the advantages of selected embodiments of the present disclosure, reference is now made to FIG. 4 which illustrates a sequence of timelines 400 showing the temporal relationship of the effect of glitch occurrences on the intended system after a period of normal device operation. As illustrated, a first timeline 410 shows a plurality of voltage glitches 411-413 which are detected after the first period of normal device operation. In the second timeline 420, the intended system process is illustrated with reference to a first period of normal device operation 421, after which a known security situation is detected 422 (e.g., password readout) and the device returns to normal operation 423. In the intended system process timeline 420, the known security situation 422 is performed before returning to the normal device operation 423 without any impact from the voltage glitches 411-413 which are expected to be safely filtered or removed by the reset glitch filters. However, it is possible for filtered glitch attacks to influence the device maliciously, as shown with the third timeline 430 wherein the first period of normal device operation 431 is followed by a second period 432 when the system is at risk for malicious influence from the detected glitches 411-413 if they are being filtered by the reset glitch filters so as to prevent the device reset reactions from being triggered.

To reduce the duration of the period when the system is at risk for malicious influence from glitches, selected embodiments of the present disclosure automatically respond to the detected glitches 411-413 by restarting the known security situation each time a glitch is detected. The resulting system behavior is illustrated with the fourth timeline 440 wherein a first period of normal device operation 441 is followed by a known security situation period 442 when the known security process is restarted each time a voltage glitch is detected before the device returns to normal operation 443. By restarting the known security process with each detected voltage glitch 411-413, the phase or duration of the known security situation period 442 is extended by an amount corresponding to the duration of the additional voltage glitches 411-413.

Another approach for reducing the system risk to exposure from voltage glitches is to respond to the detected glitches 411-413 by disabling the reset glitch filters and effectuating a device reset sequence when a glitch is detected. The resulting system behavior is illustrated with the fifth timeline 450 wherein a first period of normal device operation 451 is followed by a known security situation period 452 that occurs when the voltage glitches 411-413 are detected, at which point the device reset sequence 453 is triggered before the device returns to normal operation 454 so that the known security situation 455 can be restarted and then returned to normal device operation 456. By resetting the device with the upon detection of the voltage glitch 411-413, the normal operation of the device is delayed by at least the duration of the reset sequence 453, but the system risk originating from malicious glitches 411-413 is eliminated.

As will be appreciated, the use of a process restart or system reset reaction to a voltage glitch could lengthen or extend the phase or duration of the known security situation period or startup time in a noisy, glitch-filled environment, but since the security-relevant system sequences to be protected are timely bound, the presence of "harmless" noise will extend these phases only marginally. If there is an extended delay in achieving system or process restart, this could be an indicator that there is a noise issue on the customer's board or in the environment that the user should address, or that an attacker is attempting to access or influence the device. In either case, there are security benefits from keeping the device in reset as a secure state to protect against malicious influence from voltage glitch attacks.

While the reaction component module 306 may be configured to deactivate the reset glitch filters for the duration of the known security situation, the user configuration settings may specify that the glitch filters be permanently deactivated once a threshold number of voltage glitches are detected. Though this would leave the SoC device susceptible to noisy environments, it might be appropriate for certain applications or settings.

In addition or in the alternative, the glitch filters could be supplied as external components to the SoC device in order to physically separate the glitch filters from the SoC device in which the glitch processing unit functionality is embedded. Advantages of such an arrangement include reducing the costs for the SoC device by removing the "cost" of the glitch filters, particularly in cases where the glitch filters could be permanently deactivated. While the external location of the glitch filters would mean that a hacker could access the external glitch filters, the internal glitch processing unit functionality components could not be easily accessed by a hacker. Another advantage from external glitch filters is that the internal glitch processing unit functionality allows glitches on reset request lines of the device to be directly connected to the internal reset processing unit instead of depending on external components. However, there will be additional cost and complexity of connecting external glitch filter components, and even when the glitch filters are physically separated from the SoC device, there is no guarantee that the SoC device will not be affected by the voltage glitches.

Figure 5:
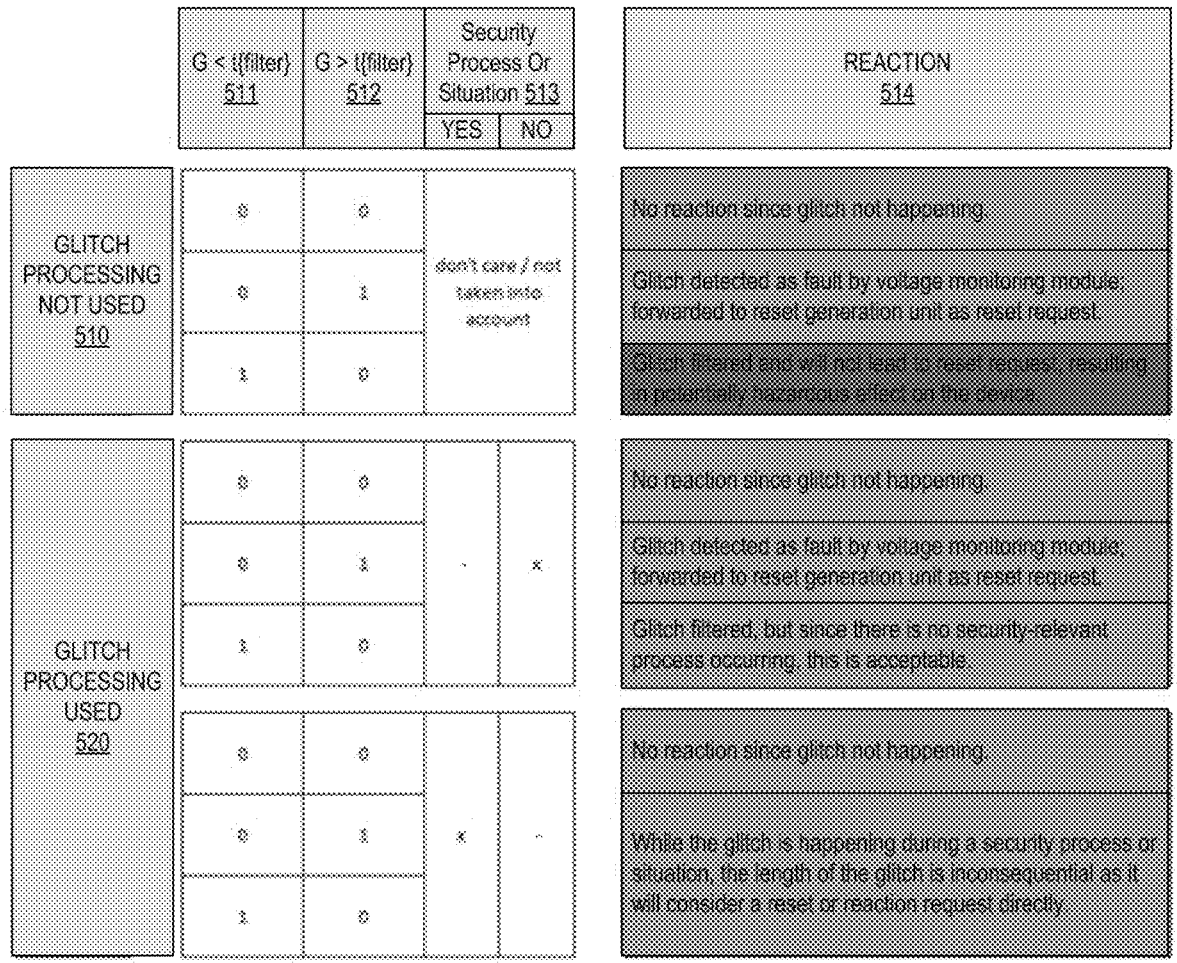
FIG. 5 shows a case table representation of the voltage detection filtering and reactions in accordance with selected embodiments of the present disclosure.

To provide an improved understanding of selected embodiments of the present disclosure, reference is now made to FIG. 5 which shows voltage detection filtering and reactions in a case table 500 for cases where the glitch processing functionality is not used (row 510) and for cases where the glitch processing functionality is used (row 520). Each of the depicted rows 510, 520 shows the voltage glitch and security process conditions 511-513 and the resulting reaction 514. In this first row 510, the device is not concerned with the status of whether there is a security process or situation (column 513), and when there is no voltage glitch (e.g., "0" entry for the glitch duration columns 511, 512), then there is no reaction (column 514) since there is no glitch in the first place. However, when there is a voltage glitch having a duration G which exceeds the reset filter detection threshold t{filter} (e.g., a "1" entry for the glitch duration column 512), then the glitch is detected as a fault by the voltage monitoring unit and forwarded to the reset generation module (column 514). And when there is a voltage glitch having a duration G which does not meet the reset filter detection threshold t{filter} (e.g., a "1" entry for the glitch duration column 511), then the glitch is filtered by the reset filters and there is no reset request sent to the reset generation module (column 514), leading to the potentially hazardous situation for device operation.

In this second row 520, the device behavior does take into account whether there is a security process or situation "x" occurring (column 513), with the location of the "x" indicating whether a security process or situation is occurring or not. When there is no voltage glitch (e.g., "0" entry for the glitch duration columns 511, 512), then there is no reaction (column 514) since there is no glitch in the first place. However, in times when the security process or situation "x" is not occurring ("x" in "NO" column 513) and there is a voltage glitch having a duration G which exceeds the reset filter detection threshold t{filter} (e.g., a "1" entry for the glitch duration column 512), then the glitch is detected as a fault by the voltage monitoring unit and forwarded to the reset generation module (column 514). But when there is a voltage glitch having a duration G which does not meet the reset filter detection threshold t{filter}(e.g., a "1" entry for the glitch duration column 511) during times when the security process or situation "x" is not occurring (column 513), then the glitch is filtered by the reset filters. In this case where there is no security process or situation "x" occurring, this filtering is acceptable in terms of any potentially hazardous situation for device operation.

Conversely, in times when the security process or situation "x" is occurring ("x" in "YES" column 513) and the glitch processing functionality is used (row 520), a voltage glitch having a duration G which exceeds the reset filter detection threshold t{filter} (e.g., a "1" entry for the glitch duration column 512) is processed by disabling the glitch filters and be issuing a reset reaction or reaction request 306C directly, regardless of the duration of the glitch (column 514). The same reaction applies to cases where the voltage glitch has a duration G which does not meet the reset filter detection threshold t{filter} (e.g., a "1" entry for the glitch duration column 511) during times when the security process or situation "x" is occurring (column 513), since the length of the glitch is inconsequential as it will be issuing a reset reaction or reaction request 306C directly. With this approach, a glitch that is detected during a security-related operation of the device is prevented from having an impact on the device operation by detecting the presence of a glitch (e.g., by using a specialized circuit of some kind, such as an analog detector) and then discarding the information which was obtained during the glitch until a clean transfer of the information is possible after a device reset or process restart is completed.

Figure 6:
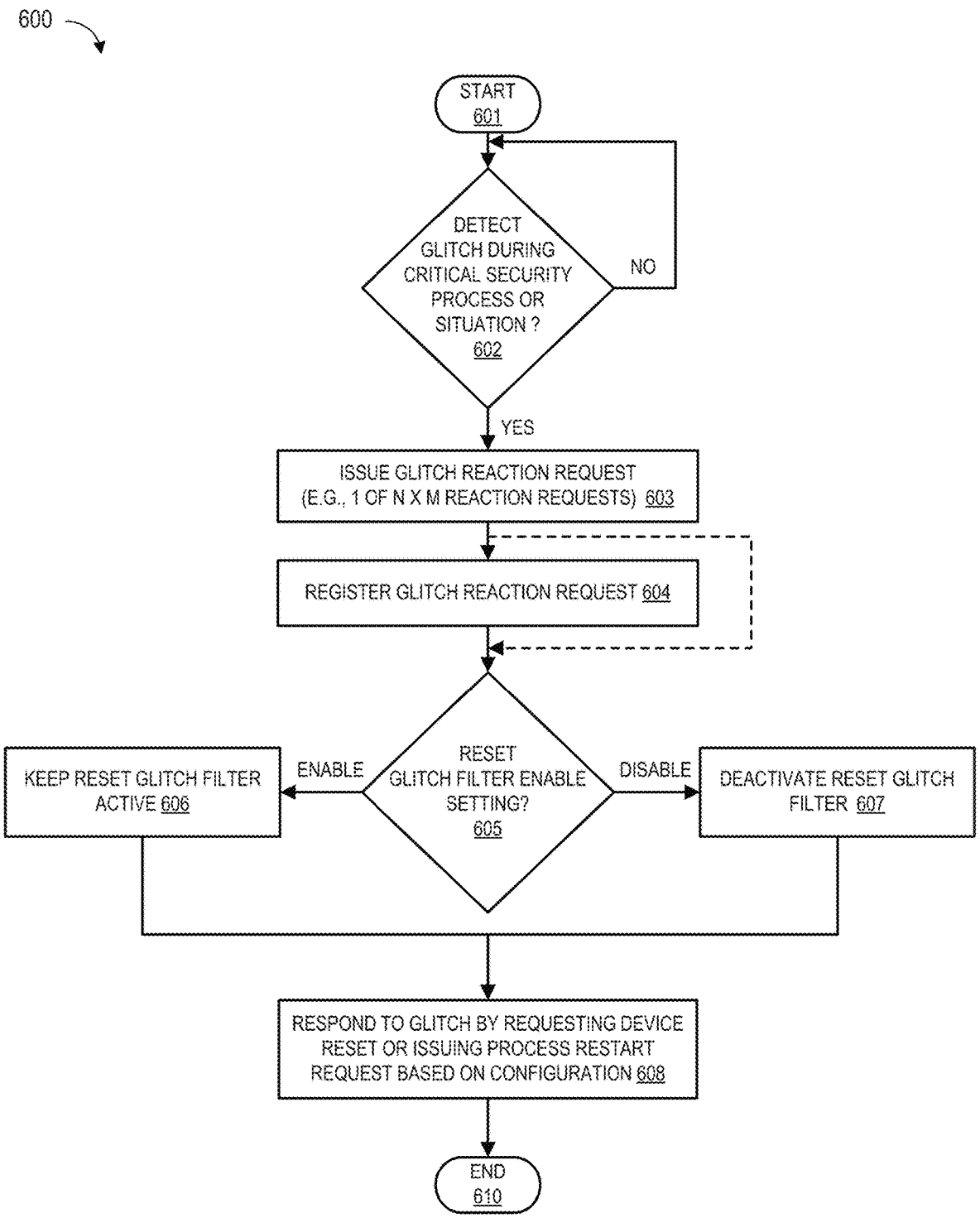
FIG. 6 illustrates a simplified flow chart showing the logic for detecting and preventing glitch attacks on a data processing system in accordance with a first selected embodiment of the present disclosure.

To provide additional details for an improved understanding of selected first embodiments of the present disclosure, reference is now made to FIG. 6 which depicts a simplified flow chart 600 showing the logic for detecting and preventing glitch attacks on a data processing system. In an example embodiment, the processing shown in FIG. 6 may be performed by a glitch processing hardware engine that is connected to receive n reset requests from one or more voltage glitch detectors along with one or more indicators for m security relevant processes, and to generate therefrom defined reaction requests which are processed without using a reset glitch filter in response to voltage glitches that are detected while there is a security relevant process.

At step 601, the control logic and/or hardware at the glitch processing hardware engine are configured to monitor the data processing system to detect if there is a voltage glitch that occurs during a critical security process or situation (step 602). As will be appreciated, a dedicated voltage monitoring circuit may be used to detect the presence of a voltage glitch on an internal bus, I/O port, or power supply or reset line of or in a data processing system. In addition, the data processing system may also include circuitry for detecting when a critical security process or situation is occurring.

If there is no voltage glitch detected during a critical security process or situation (negative outcome to detection step 602), then the monitoring process continues. However, if a voltage glitch is detected during a critical security process or situation (affirmative outcome to detection step 602), then a glitch reaction request is issued (at step 603). For example, in a data processing system with n reset lines that monitored for voltage glitches during m critical security processes, the glitch processing hardware engine may issue 1 of n×m reaction requests at step 603.

Once a glitch reaction request is issued (step 603), the glitch processing hardware engine may optionally register the glitch reaction request (step 604). In selected embodiments, a registration component may be used to monitor, capture, and register glitch reaction requests. By registering the glitch reaction request occurrences as they are detected, the application software can take the detected glitch occurrences into account immediately or at a later point of application execution time. As will be appreciated, the registration step 604 may be bypassed in selected embodiments, as indicated by the dashed bypass lines.

At step 605, the status of the reset glitch filter is determined. In selected embodiments, status determination is made by the glitch processing hardware engine which determines the status of the reset glitch filter enable setting. If the reset glitch filter is enabled (e.g., "Enable" outcome from detection step 605), the reset glitch filter is active (step 606) and the detected voltage glitch is processed by responding to the voltage glitch with a device reset or process restart request (step 608), depending on the applicable configuration data. However, if the reset glitch filter is disabled (e.g., "Disable" outcome from step 605), then the reset glitch filter is disabled (step 607) while the response to the detected voltage glitch is processed (step 608) with a device reset or process restart request, depending on the applicable configuration data. At step 610, the process ends.

Figure 7:
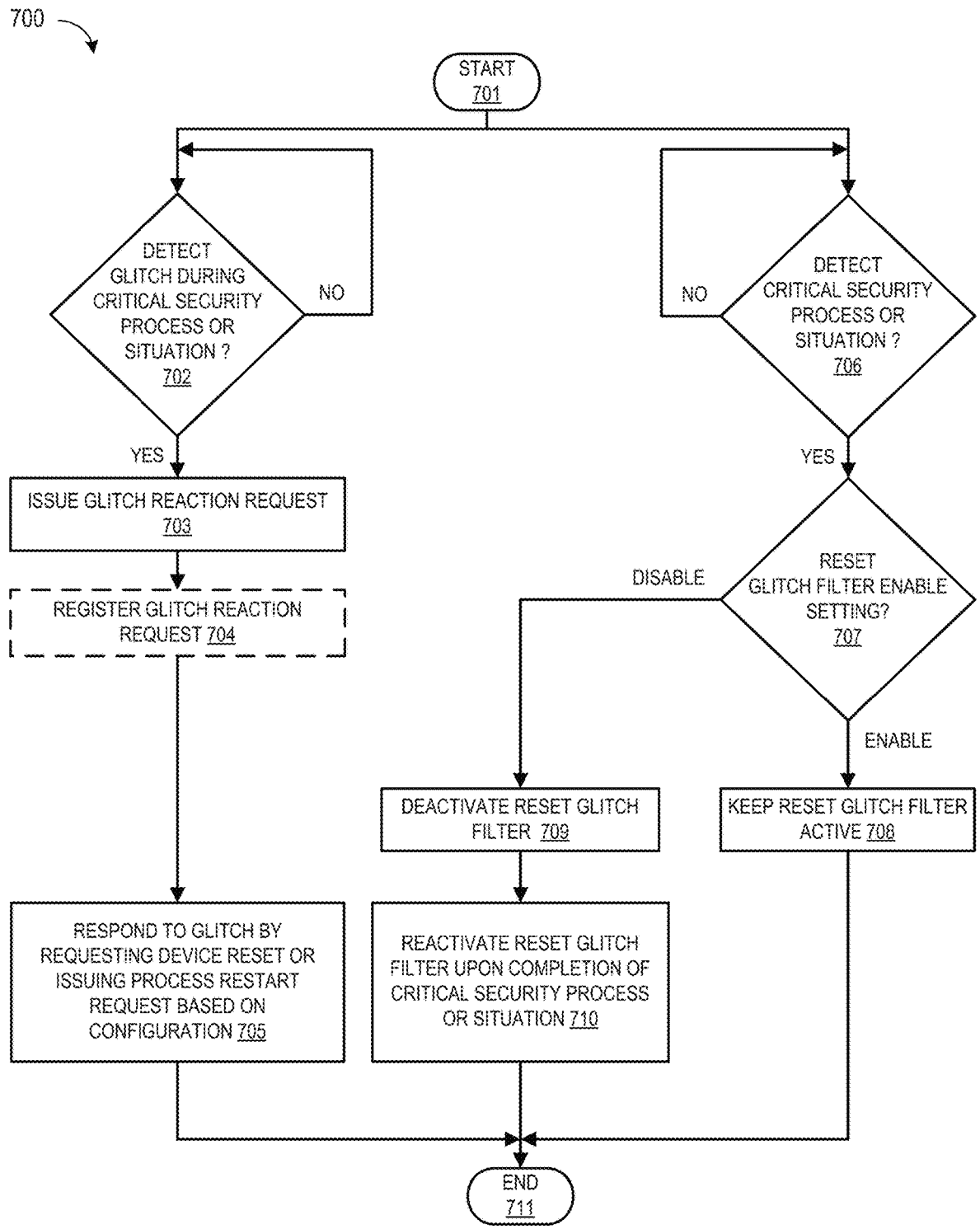
FIG. 7 illustrates a simplified flow chart showing the logic for detecting and preventing glitch attacks on a data processing system in accordance with a second selected embodiment of the present disclosure.

To provide additional details for an improved understanding of selected second embodiments of the present disclosure, reference is now made to FIG. 7 which depicts a simplified flow chart 700 showing the logic for detecting and preventing glitch attacks on a data processing system. In an example embodiment, the processing shown in FIG. 7 may be performed by a glitch processing hardware engine that is connected to receive n reset requests from one or more voltage glitch detectors along with one or more indicators for m security relevant processes, and to generate therefrom defined reaction requests which are processed without using a reset glitch filter in response to voltage glitches that are detected while there is a security relevant process.

At step 701, the control logic and/or hardware at the glitch processing hardware engine are configured to monitor the data processing system in two parallel processes to detect if there is a voltage glitch that occurs during a critical security process or situation. In a first process that begins with detection step 702, the process detects if a voltage glitch occurs during a critical security process or situation. In selected embodiments, a dedicated voltage monitoring circuit may be used to detect the presence of a voltage glitch on an internal bus, I/O port, or power supply or reset line of a data processing system. If there is no voltage glitch detected during a critical security process or situation (negative outcome to detection step 702), then the monitoring process continues. However, if a voltage glitch is detected during a critical security process or situation (affirmative outcome to detection step 702), then a glitch reaction request is issued (at step 703), followed by an optional registration of the glitch reaction request (step 704), as indicated by the dashed lines around step 704. At step 705, a response to the detected voltage glitch is processed at step 705 by requesting a device reset or issuing a process restart request, depending on the applicable configuration data, and the first process ends at step 711.

In parallel, a second process begins with detection step 706 which determines if a critical security process or situation is occurring. In selected embodiments, the determination of whether a critical security process or situation is occurring is made by dedicated circuitry or application code in the data processing system. If there is no critical security process or situation occurring (negative outcome to detection step 706), then the monitoring process at step 706 continues. However, if a critical security process or situation is detected (affirmative outcome to detection step 706), the status of the reset glitch filter is determined at step 707. In selected embodiments, status determination is made by the glitch processing hardware engine which determines the status of the reset glitch filter enable setting. If the reset glitch filter is enabled (e.g., "Enable" outcome from detection step 707), the reset glitch filter is kept active (step 708) so that the detected voltage glitch is processed by the enabled reset glitch filter and the process ends (step 711). However, if the reset glitch filter is disabled (e.g., "Disable" outcome from detection step 707), then the reset glitch filter is deactivated (step 709) until completion of the security process or situation which will lead to the reactivation of the reset glitch filter (step 710), depending on the applicable configuration data. At step 711, the process ends.

As disclosed herein, the glitch security detection method, system, and apparatus may be implemented as a glitch processing hardware engine that is connected and controlled by control logic and/or computer program product having program code portions for performing steps of a method and/or for performing functions of a device or system for detecting voltage glitches on an internal bus, I/O port, or power supply or reset line of a data processing system during critical security processes to enable selective deactivation of glitch filters while different configurable reset reactions or restart requests are generated. Although embodiments are described in the context of monitoring reset request lines, the proposed glitch processing hardware method, system, and apparatus may be implemented to detect and protect against voltage glitches in a wide range of device applications.

Some of the above embodiments, as applicable, may be implemented using a variety of different data processing systems. For example, although FIG. 3 and the discussion thereof describe an exemplary data processing architecture of microcontroller SoC device in which a glitch processing unit is employed, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architecture depicted herein is merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality. Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

By now it should be appreciated that there has been provided an apparatus, method, program code, and system for improving computer security by preventing a glitch attack during a specified security system sequence of a device. In the disclosed apparatus, method, program code, and system, a glitch processing hardware unit detects a voltage glitch on a monitored line (e.g., an internal bus, I/O port, or power supply or reset line of a data processing system) that occurs during a specified security system sequence (e.g., a lifecycle detection and elaboration sequence, a password read out sequence, or a sequence for detecting a crypto key, password, unique ID, device lifecycle, or boot locations). In selected embodiments, the voltage glitch is detected when an instantaneous voltage exceeds a specified voltage threshold. In response to detecting the voltage glitch on the monitored line, the glitch processing hardware unit deactivates a glitch filter connected between the monitored line and a reset processing unit. In selected embodiments, the glitch filter is deactivated by resetting a filter enable input setting for a reset glitch filter. In addition, the glitch processing hardware unit automatically drives a requested reaction in response to the voltage glitch by driving one of a plurality of configurable reactions, including a device reset reaction and/or a process restart request, thereby preventing the voltage glitch from maliciously influencing the specified security system sequence. In selected embodiments, the requested reaction is driven by issuing a reset request to the reset processing unit in response to the voltage glitch to trigger the device reset reaction. In other embodiments, the requested reaction is driven by issuing a process restart request to one or more modules which implement the specified security system sequence in response to the voltage glitch to trigger a restart of the specified security system sequence. As disclosed, the glitch processing hardware unit may be configured to specify a specific requested reaction for each combination of monitored line and specified security system sequence.

In another form, there is provided a glitch processing hardware system, apparatus, and method of operation for preventing glitch attacks. In the disclosed system, situation detector hardware generates a reaction request upon detecting a voltage glitch on a monitored line (e.g., an internal bus, I/O port, or power supply or reset line of a data processing system) during a specified security system sequence (e.g., a lifecycle detection and elaboration sequence, a password read out sequence, or a sequence for detecting a crypto key, password, unique ID, or boot location). The glitch processing hardware system may also include a registration hardware unit that monitors and registers each reaction request. In addition, the glitch processing hardware system includes a reaction hardware component that is connected to deactivate a glitch filter in response to the reaction request and to automatically generate one of a plurality of configurable reactions comprising a device reset reaction and a process restart request, thereby preventing the voltage glitch from maliciously influencing the specified security system sequence. In selected embodiments, the reaction hardware component is connected to deactivate the glitch filter by resetting a filter enable input setting for a reset glitch filter. The reaction hardware component may also be connected to automatically generate one of the plurality of configurable reactions by issuing a reset request to a reset processing unit in response to the voltage glitch to trigger the device reset reaction. The reaction hardware component may also be connected to automatically generate one of the plurality of configurable reactions by issuing a process restart request to one or more modules which implement the specified security system sequence in response to the voltage glitch to trigger a restart of the specified security system sequence. In this way, the reaction hardware component may be configured to generate a specific configurable reaction for each combination of monitored line and specified security system sequence.

In another form, there is provided an integrated circuit (IC) System-on-Chip (SoC) device and method of operation for preventing glitch attacks. In selected embodiments, the disclosed IC SoC device includes a reset processing unit, a plurality of n reset glitch filters, and a glitch processing hardware component. The disclosed reset processing unit handles reset requests to reset the IC SoC device. The n reset glitch filters are each connected between one of n monitored lines (e.g., an internal bus, I/O port, or power supply or reset line of the IC SoC device) and the reset processing unit. The glitch processing hardware component is connected between the n monitored lines and the reset processing unit, the glitch processing hardware component connected (a) to receive up to m security system sequence indicators and (b) to deactivate the plurality of n reset glitch filters and to generate one of a plurality of configurable requests comprising a device reset request for the reset processing unit and a process restart request upon detecting a voltage glitch on one of the n monitored lines during a specified security system sequence. Each of the m security system sequence indicators may embody an indicator for a lifecycle detection and elaboration sequence, a password read out sequence, or a sequence for detecting a crypto key, password, unique ID, or boot location. In selected embodiments, the glitch processing hardware component may include a situation detector hardware for generating a reaction request upon detecting a voltage glitch on one of the n monitored lines during a specified security system sequence; and a reaction hardware component connected to deactivate the plurality of n reset glitch filters in response to the reaction request and to automatically generate one of the plurality of configurable requests, thereby preventing the voltage glitch from maliciously influencing the specified security system sequence. In addition, the glitch processing hardware component may include a registration hardware unit for monitoring and registering each reaction request generated by the situation detector.

Various illustrative embodiments of the present invention have been described in detail with reference to the accompanying figures. While various details are set forth in the foregoing description, it will be appreciated that the present invention may be practiced without these specific details, and that numerous implementation-specific decisions may be made to the invention described herein to achieve the circuit designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Although the described exemplary embodiments disclosed herein are directed to an exemplary multi-channel direct memory access hardware engine, the present invention is not necessarily limited to the example embodiments illustrate herein, and various embodiments of the circuitry and methods disclosed herein may be implemented with other devices and software components. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for improving computer security by preventing a glitch attack during a specified security system sequence of a device, comprising:
   detecting, by the device, a voltage glitch on a monitored line during the specified security system sequence;
   deactivating, by the device, a reset glitch filter connected between the monitored line and a reset processing unit using a glitch processing hardware unit in response to detecting the voltage glitch on the monitored line; and
   automatically driving, by the device, a requested reaction in response to the voltage glitch using the glitch processing hardware unit which drives one of a plurality of configurable reactions comprising a device reset reaction and a process restart request, thereby preventing the voltage glitch from maliciously influencing the specified security system sequence.

2. The method of claim 1, where the monitored line comprises an internal bus, I/O port, or power supply or reset line of a data processing system.

3. The method of claim 1, where detecting the voltage glitch comprises detecting an instantaneous voltage that exceeds a specified voltage threshold.

4. The method of claim 1, where the specified security system sequence comprises a lifecycle detection and elaboration sequence, a password read out sequence, or a sequence for detecting a crypto key, password, unique ID, device life-cycle, or boot location.

5. The method of claim 1, where deactivating the reset glitch filter comprises resetting a filter enable/disable signal for the reset glitch filter.

6. The method of claim 1, where automatically driving the requested reaction comprises issuing a reset request from the glitch processing hardware unit to the reset processing unit in response to the voltage glitch to trigger the device reset reaction.

7. The method of claim 1, where automatically driving the requested reaction comprises issuing a process restart request to one or more modules which implement the specified security system sequence in response to the voltage glitch to trigger a restart of the specified security system sequence.

8. The method of claim 1, where the glitch processing hardware unit is configured to specify a specific requested reaction for each combination of monitored line and specified security system sequence.

9. A glitch processing hardware system for preventing glitch attacks, comprising:
   a situation detector hardware for generating a reaction request upon detecting a voltage glitch on a monitored line during a specified security system sequence;
   a registration hardware unit for monitoring and registering each reaction request to allow multiple reaction requests to be evaluated at a later point in execution time; and
   a reaction hardware component connected to deactivate a reset request glitch filter in response to the reaction request and to automatically generate one of a plurality of configurable reactions comprising a device reset reaction and a process restart request, thereby preventing the voltage glitch from maliciously influencing the specified security system sequence.

10. The glitch processing hardware system of claim 9, where the monitored line comprises an internal bus, I/O port, or power supply or reset line of a data processing system.

11. The glitch processing hardware system of claim 9, where the specified security system sequence comprises a lifecycle detection and elaboration sequence, a password read out sequence, or a sequence for detecting a crypto key, password, unique ID, or boot location.

12. The glitch processing hardware system of claim 9, where the reaction hardware component is connected to deactivate the glitch filter by resetting a filter enable input setting for a reset glitch filter.

13. The glitch processing hardware system of claim 9, where the reaction hardware component is connected to automatically generate one of the plurality of configurable reactions by issuing a reset request to a reset processing unit in response to the voltage glitch to trigger the device reset reaction.

14. The glitch processing hardware system of claim 9, where the reaction hardware component is connected to automatically generate one of the plurality of configurable reactions by issuing a process restart request to one or more modules which implement the specified security system sequence in response to the voltage glitch to trigger a restart of the specified security system sequence.

15. The glitch processing hardware system of claim 9, where the reaction hardware component is configured to generate a specific configurable reaction for each combination of monitored line and specified security system sequence.

16. An integrated circuit (IC) System-on-Chip (SoC) device, comprising:
   a reset processing unit for handling reset requests to reset the IC SoC device;
   a plurality of n reset glitch filters, each connected between one of n monitored lines and the reset processing unit; and
   a glitch processing hardware component connected between the n monitored lines and the reset processing unit, the glitch processing hardware component connected (a) to receive up to m security system sequence indicators and (b) to deactivate the plurality of n reset glitch filters and to generate one of a plurality of configurable requests comprising a device reset request for the reset processing unit and a process restart request, upon detecting a voltage glitch on one of the n monitored lines during a specified security system sequence.

17. The IC SoC device of claim 16, where the glitch processing hardware component comprises:
   a situation detector hardware for generating a reaction request upon detecting a voltage glitch on one of the n monitored lines during a specified security system sequence; and
   a reaction hardware component connected to deactivate the plurality of n reset glitch filters in response to the reaction request and to automatically generate one of the plurality of configurable requests, thereby preventing the voltage glitch from maliciously influencing the specified security system sequence.

18. The IC SoC device of claim 17, where the glitch processing hardware component comprises registration hardware unit for monitoring and registering each reaction request generated by the situation detector.

19. The IC SoC device of claim 16, where each of the n monitored lines comprises an internal bus, I/O port, or power supply or reset line of the IC SoC device.

20. The IC SoC device of claim 16, where each of the m security system sequence indicators comprise an indicator for a life-cycle detection and elaboration sequence, a password read out sequence, or a sequence for detecting a crypto key, password, unique ID, or boot location.

\* \* \* \* \*